United States Patent
Asaya

[11] Patent Number: 5,767,890
[45] Date of Patent: Jun. 16, 1998

[54] IMAGE OUTPUT APPARATUS

[75] Inventor: Yasumasa Asaya, Kanagawa, Japan

[73] Assignee: Fuji Xerox Co., Ltd., Tokyo, Japan

[21] Appl. No.: 423,869

[22] Filed: Apr. 18, 1995

[30] Foreign Application Priority Data

Jun. 27, 1994 [JP] Japan ................... 6-165820

[51] Int. Cl.$^6$ ................... B41J 2/47
[52] U.S. Cl. ................... 347/253; 347/261
[58] Field of Search ................... 347/246, 253, 347/252, 232, 231, 233, 256, 238, 261; 358/298

[56] References Cited

U.S. PATENT DOCUMENTS 4,862,288  8/1989  Sekiya ................... 358/298
5,504,517  4/1996  Takashi et al. ................... 347/246

Primary Examiner—Benjamin R. Fuller
Assistant Examiner—Thinh Nguyen
Attorney, Agent, or Firm—Finnegan, Henderson, Farabow, Garrett & Dunner, L.L.P.

[57] ABSTRACT

An image output apparatus such as a laser printer in which, in the case where the write density is changed, the light quantity is controlled by using a period when the rotational speed of a polygonal mirror is changed. In the apparatus, when an instruction for switching the write density is issued and the rotational speed of the polygonal mirror is set to be a changed value, a laser beam forced turn-off signal generating circuit generates a laser beam forced turn-off signal having a turn-off period which corresponds to the rotational speed of the polygonal mirror. During the period when the rotational speed of the polygonal mirror is changed, a laser beam light quantity controlling circuit controls the light quantity of the laser diode so as to have a value corresponding to the changed write density. Even during a period when the rotational speed of the polygonal mirror is changed, therefore, the light quantity can be controlled without exposing the photoreceptor to light.

3 Claims, 4 Drawing Sheets

1

IMAGE OUTPUT APPARATUS

BACKGROUND OF THE INVENTION

1. Field of the Invention

The invention relates to an image output apparatus, and particularly to an image output apparatus such as a laser printer in which, in the case where the write density is changed, the light quantity is controlled by using a period when the rotational speed of a polygonal mirror is changed.

2. Discussion of the Related Art

Conventionally, a laser beam printer is known in which a laser beam emitted from a laser diode is deflected by a rotary polygonal mirror to scan a photoreceptor, the laser diode is turned on and off by image data sent from a host computer or the like in accordance with an output of a beam position detecting sensor which is located in an edge portion of the scanning region, thereby forming an electrostatic latent image on the photoreceptor, the latent image is then developed by toner, and the toner image is transferred onto a recording sheet to accomplish an image formation process.

In such a laser beam printer, in order to conform to image signals indicative of various write densities which are sent from the host computer or the like, the rotational speed of the polygonal mirror is changed. Generally, it requires a period of several seconds to change the rotational speed of a motor which drives the polygonal mirror. When the write density is to be changed, therefore, a print operation pause period of several seconds is produced.

Incidentally, in such a laser beam printer, undesired emission of laser beams other than that corresponding to image signals produces various inconveniences such as fatigue of the photoreceptor, consumption of the toner, and contamination of the interior of the apparatus due to the toner, and hence is requested to be reduced to a minimum level. To comply with this, the turn-on control for stabilizing the light quantity of the laser beam is conducted in a period other than that of scanning the photoreceptor.

FIGS. 6 and 7 are diagrams showing the turn-on control which is conducted when the write density is switched from a lower one to a higher one. More specifically, FIG. 6 shows the turn-on control which is conducted when the video clock (VCLK) signal is switched from a lower frequency one to a higher frequency one at the time (time t0) when the operation of switching the rotational speed of the polygonal mirror is started. FIG. 7 shows the turn-on control which is conducted when the VCLK signal is switched from a lower frequency one to a higher frequency one at the time (time t1) when the operation of switching the rotational speed of the polygonal mirror is completed. In the figures, SOS designates beam detecting sensors which are located so as to be separated from the photoreceptor.

In the case of FIG. 6, during the portion hatched by oblique lines of the period (t0–t1) when the rotational speed of the polygonal mirror is changed, the photoreceptor is irradiated with a beam. By contrast, in the case of FIG. 7, during the period (t0–t1) when the rotational speed of the polygonal mirror is changed, the photoreceptor is irradiated with a beam on every other line as indicated by the horizontal lines.

As described above, when the write density is changed, the rotational speed of the polygonal mirror becomes indefinite, and hence it is difficult to conduct the control of stabilizing the light quantity of the laser beam while turning on the laser diode in a period other than that of scanning the photoreceptor.

To comply with this, a technique is proposed in which the turn-on operation of a laser diode is inhibited during a period when the operation of changing the write density is conducted (Japanese Patent Unexamined Publication No. Sho. 63-243974).

As seen from the above, when the turn-on control for stabilizing the light quantity of the laser beam is conducted during a period other than that when the operation of scanning the photoreceptor is conducted, there arises a problem in that the photoreceptor is irradiated with a beam as illustrated in conjunction with FIGS. 6 and 7. When the light emission of the laser diode is stopped during a period when the operation of changing the write density is conducted, furthermore, a period of conducting the laser diode turn-on control for switching the light quantity is additionally required, thereby producing a further problem in that the operation of switching the write density requires a prolonged period.

SUMMARY OF THE INVENTION

It is an object of the invention to provide an image output apparatus which can solve the above-mentioned problems in the conventional apparatus, and in which, even during a period when the rotational speed of a polygonal mirror is changed, the light quantity can be controlled without exposing a photoreceptor to light. It is another object of the invention to provide an image output apparatus in which the light quantity is controlled by using a period when the rotational speed of a polygonal mirror is changed, so that the period required for switching the write density is shortened.

In order to attain the above objects, the invention provides an image output apparatus in which a laser beam emitted from a laser diode is caused to scan a photoreceptor by a rotary polygonal mirror, thereby forming an image on the photoreceptor, the apparatus including: means for, when a write density is changed, setting a rotational speed of the rotary polygonal mirror to a value corresponding to the changed write density; laser beam forced turn-off signal generating means for, during a period when the rotational speed of the rotary polygonal mirror is changed, generating a forced turn-off signal having a turn-off period which corresponds to the rotational speed of the rotary polygonal mirror; and laser beam light quantity controlling means for, when the write density is changed, switching a reference value of light quantity to another reference value corresponding to the changed write density, and for, during the period when the rotational speed of the rotary polygonal mirror is changed, controlling the light quantity of the laser diode in a laser beam turn-on period when the forced turn-off signal is not effective.

DETAILED DESCRIPTION OF THE PREFERRED EMBODIMENT

Figure 1:
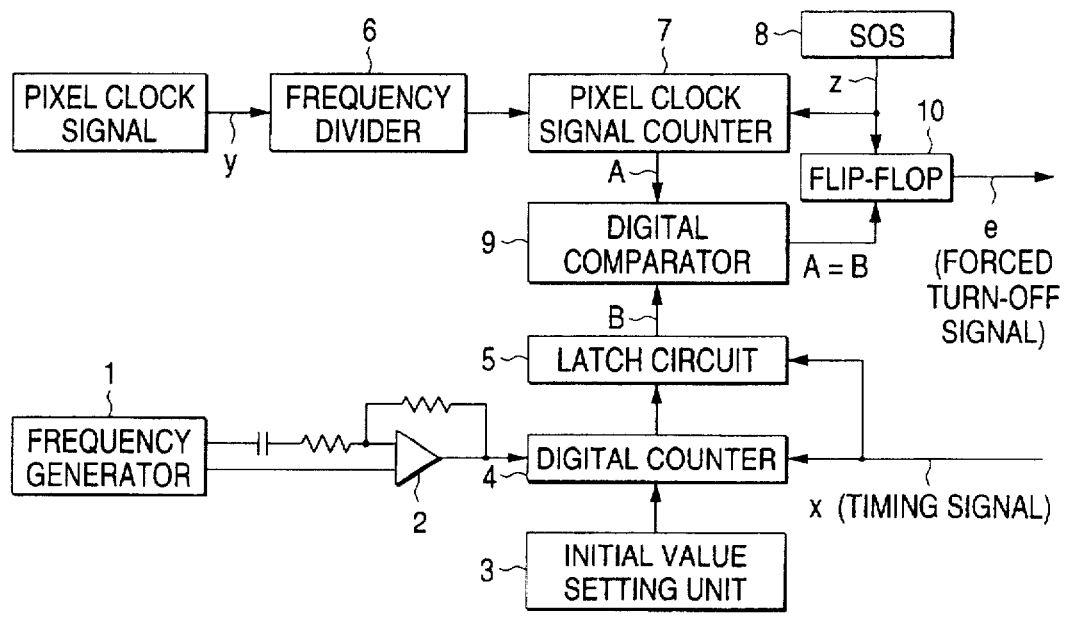
FIG. 1 is a block diagram of a laser beam forced turn-off signal generating circuit used in an embodiment of the invention.

Hereinafter, the invention will be described in detail with reference to the drawings. FIG. 1 is a block diagram of a laser beam forced turn-off signal generating circuit used in an embodiment of the invention.

A frequency generator (F.G.) 1 coupled to a polygonal mirror driving motor which is not shown generates a pulse signal which is proportional to the rotational speed of the motor. The pulse signal is amplified by an amplifier 2 and then supplied to a digital counter 4. The digital counter 4 is reset by a timing signal x and loaded with the initial value from an initial value setting unit 3. The digital counter 4 then counts down the value in accordance with the pulse signal supplied via the amplifier 2. A latch circuit 5 latches the count value of the digital counter 4 when the timing signal is supplied to the circuit. As the polygonal mirror driving motor rotates at a higher rotational speed, therefore, the latch circuit 5 latches a smaller value.

A pixel clock signal y is frequency-divided by a frequency divider 6 and then supplied to a pixel clock signal counter 7. A beam detecting sensor (SOS) 8 is disposed outside the beam scanning region of a photoreceptor. A beam detecting signal z from the beam detecting sensor is supplied to the pixel clock signal counter 7 to reset the counter, and sets a flip-flop 10, with the result that the output of the flip-flop 10 is raised or the flip-flop outputs a laser beam forced turn-off signal e. The pixel clock signal counter 7 counts the pixel clock signal from the frequency divider 6. A digital comparator 9 compares the count value A of the counter with the value B which has been latched by the latch circuit 5. When the count values A and B are equal to each other, the digital comparator 9 outputs a signal which is then supplied to the flip-flop 10 to reset it. Consequently, the flip-flop 10 outputs the laser beam forced turn-off signal e during the period between the instance when the beam detecting sensor 8 detects the beam, and that when the digital comparator 9 outputs the signal indicative of A=B.

Figure 2:
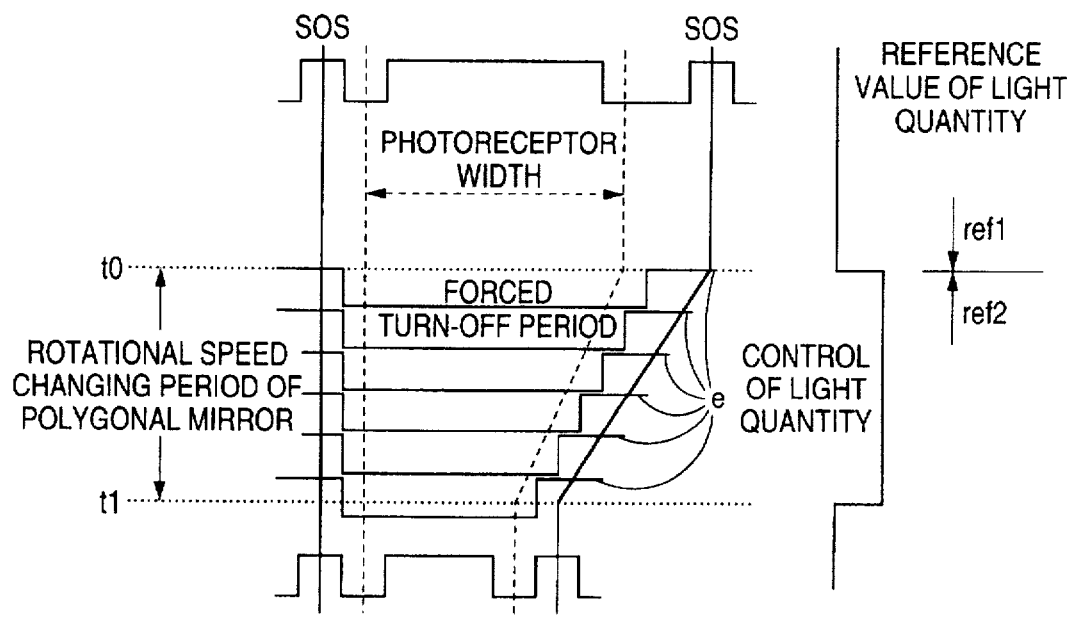
FIG. 2 is a diagram showing a turn-on control which is conducted when the write density is switched from a lower one to a higher one in the embodiment.

As seen from the above, the circuit of FIG. 1 switches the write density at time t0 as shown in FIG. 2. When the rotational speed of the polygonal mirror driving motor is increased, the pulse width of the laser beam forced turn-off signal (i.e., the forced turn-off period) is shortened in accordance with the rotational speed of the motor so that the laser beam application is turned off during the period when the laser beam passes over the photoreceptor. As a result, the turn-on control in the case where the write density is switched from a lower one to a higher one can be conducted in a desired manner.

Next, the operation of the laser beam forced turn-off signal generating circuit will be described by using a specific example. It is assumed that the polygonal mirror is rotated at 6,000 rpm in the case where the write density is 400 DPI, and 6 pulses of the FG pulse signal are generated for each rotation so that the FG pulse signal has a frequency of 600 Hz in this case. The initial value setting unit 3 loads "425" as the initial value into the digital counter 4, and the timing signal x is supplied to the latch circuit 5 at the interval of 0.283 sec. When the count-down operation is conducted 170 times, therefore, the latch circuit 5 latches the count value "255" which corresponds to 6,000 rpm. On the other hand, the frequency divider 6 divides by 16 the frequency of the pixel clock signal y for 400 DPI. Therefore, the width of the laser beam forced turn-off signal is set to correspond to the count value "255" so that the laser beam is turned off in the width of 250 mm of the photoreceptor.

When the rotational speed of the polygonal mirror is changed to 9,000 rpm so that the write density is switched to 600 DPI, the frequency of the FG pulse signal is increased to 900 Hz. Consequently, the latch circuit 5 latches the count value "170" which is obtained by counting down the initial value by 255 times.

According to the embodiment, when the rotational speed of the polygonal mirror driving motor is increased by 1.5 times, therefore, the digital counter 4 has a count value which is decreased by 1/1.5 times, and also the laser beam forced turn-off signal has a width which is decreased by 1/1.5 times. As a result, the laser beam is turned off during the period when the laser beam scans the photoreceptor, thereby eliminating the inconvenience that the photoreceptor is unnecessarily deteriorated during the period (t0–t1) when the rotational speed of the polygonal mirror is changed.

Figure 3:
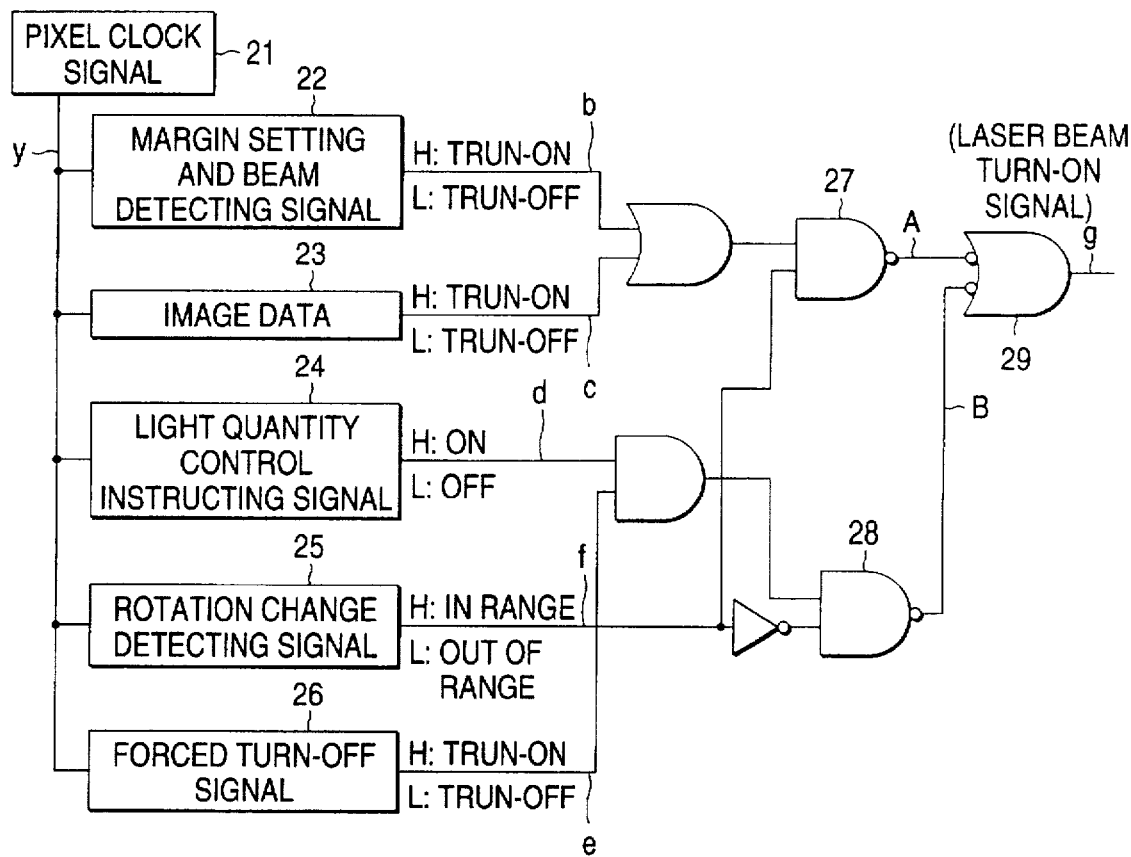
FIG. 3 is a circuit diagram of a laser beam turn-on signal generating circuit used in the embodiment.
Figure 4:
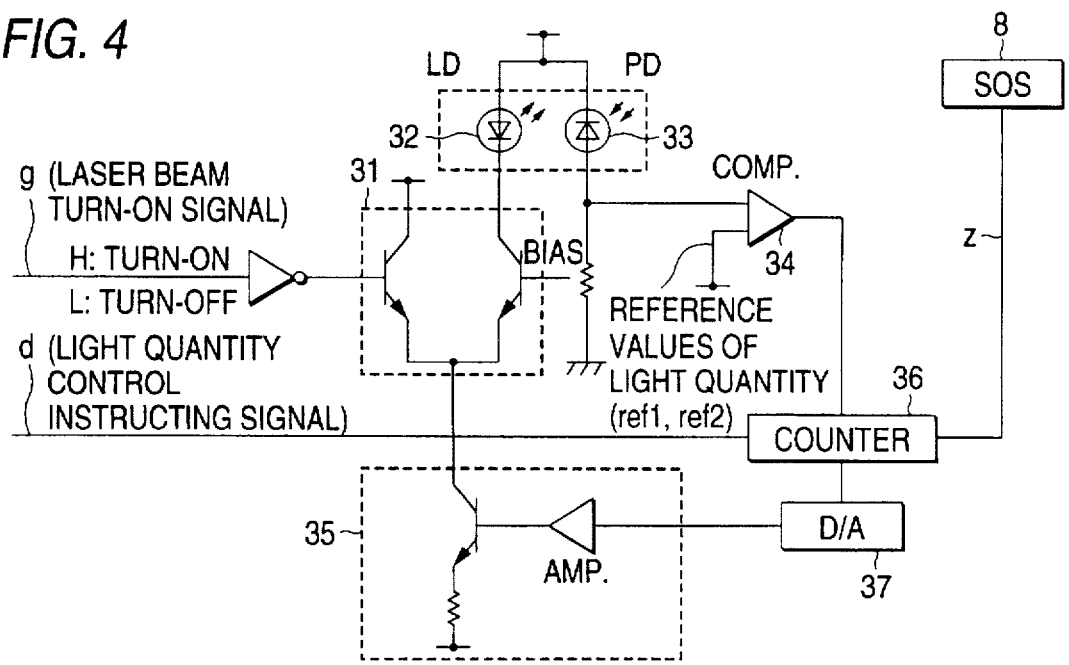
FIG. 4 is a circuit diagram of a laser beam light quantity controlling circuit used in the embodiment.

Next, the control of the light quantity of the laser diode will be described. FIG. 3 shows a laser beam turn-on signal generating circuit used in the control of the laser beam light quantity, FIG. 4 shows a laser beam light quantity controlling circuit, and FIGS. 5(a) to 5(h) are timing charts of signals appearing at main portions of the circuits of FIGS. 3 and 4.

In FIG. 3, reference numeral 21 designates a pixel clock signal; 22, a margin setting and beam detecting signal; 23, image data; 24, a light quantity control instructing signal; 25, a rotation change detecting signal; 26, a forced turn-off signal; and 27, 28 and 29, logic circuits. In FIG. 4, reference numeral 31 designates a laser modulating circuit; 32, a laser diode; 33, a light quantity monitoring photodiode; 34, a comparator; 35, a current control circuit; 36, a digital counter; and 37, a digital-to-analog (D/A) converter.

Figure 5:
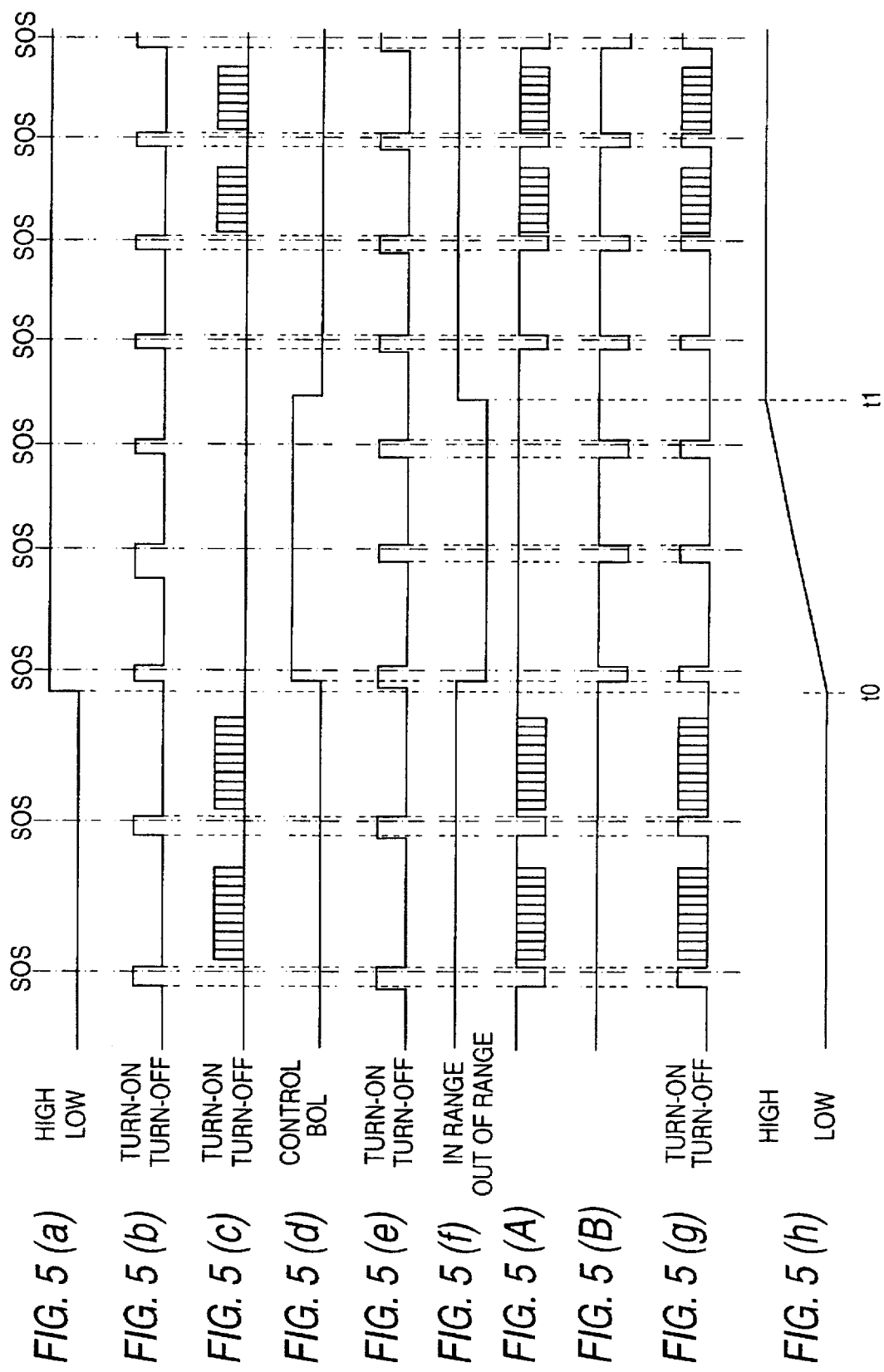
FIGS. 5(a) to 5(f), FIGS. 5(A), 5(B), 5(g), and 5(h) are timing charts of signals appearing at main portions in the embodiment.
Figure 6:
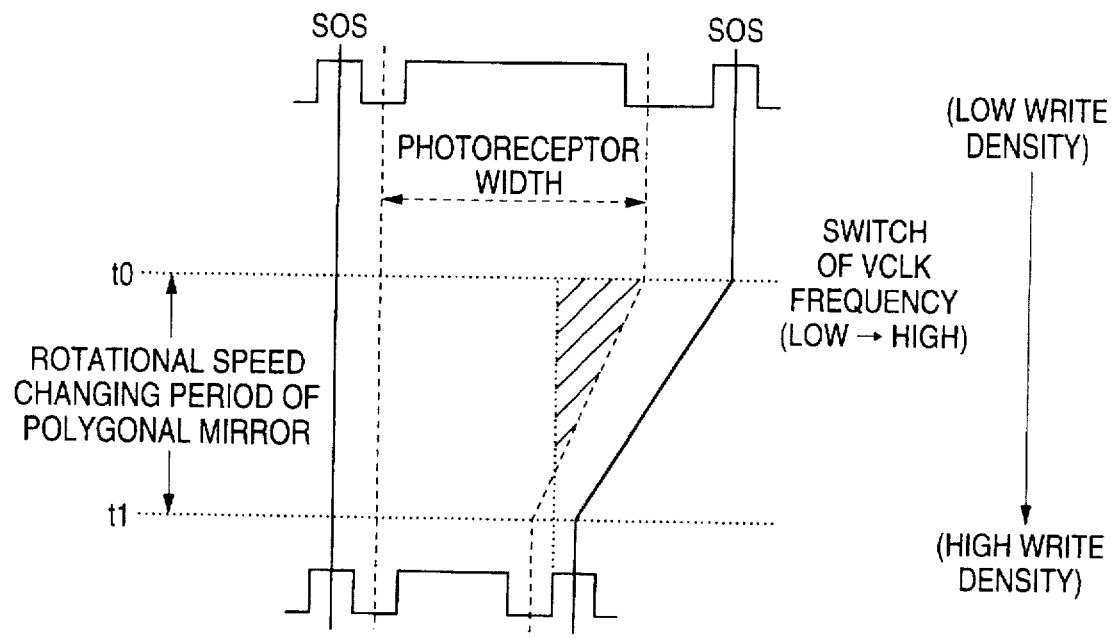
FIG. 6 is a diagram showing a turn-on control which is conducted when the write density is switched from a lower one to a higher one in a conventional apparatus.
Figure 7:
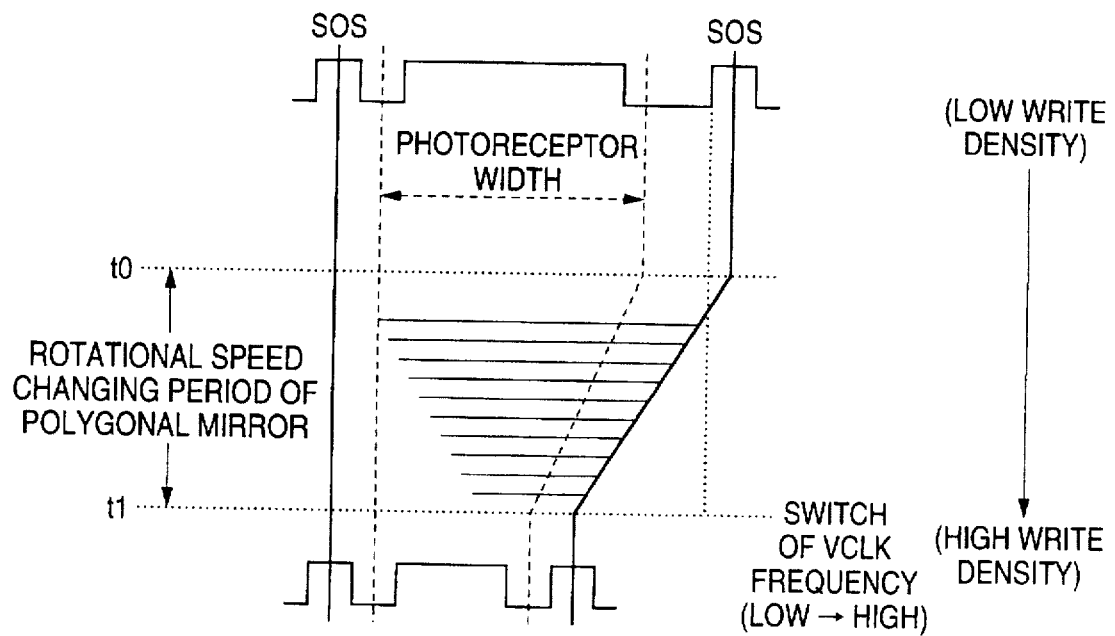
FIG. 7 is a diagram showing another turn-on control which is conducted when the write density is switched from a lower one to a higher one in the conventional apparatus.

The operation of the light quantity control in the embodiment will be described with reference to the timing charts of FIGS. 5(a) to 5(h). FIG. 5(a) indicates a write density switch signal, and FIG. 5(h) indicates the rotational speed of the polygonal mirror driving motor. The other symbols (b), (c), in FIGS. 5(a) to 5(h) indicate the signals in FIGS. 3 and 4 which are indicated by the same symbols, respectively.

As illustrated, the write density a is to be switched at time t0 from a lower one to a higher one. Before the time t0, the usual operation for a low write density is done. When an instruction for switching the write density is issued at time t0 from a host computer or the like, the polygonal mirror driving motor starts the operation for transferring the rotational speed h from a lower one to a higher one. This causes the rotation change detecting signal f to be changed from H level to L level. Then the light quantity control instructing signal d is changed from L level to H level and the process enters the light quantity control phase.

When the rotation change detecting signal f is changed to L level, the logic circuit 28 of FIG. 3 is made effective and an inverted signal B of an AND output of the light quantity control signal d and the forced turn-off signal e is converted into the laser beam turn-on signal g which is output from the logic circuit 29. As seen from the signal B, the laser beam turn-on signal g is H level only in a short period including an instant when the laser beam is to pass over the beam detecting sensor (SOS), and the operation of turning on the laser beam is enabled. Since the forced turn-off signal e is a signal output from the flip-flop 10 of FIG. 1, it is apparent that the above-mentioned turn-on of the laser beam does not cause the photoreceptor to be irradiated with the laser beam.

During the period when the laser beam turn-on signal g is H level, the transistor in the laser modulating circuit 31 of FIG. 4 to which a bias voltage is applied is turned on so that a current flows through the laser diode 32. The light quantity of the laser diode 32 is sensed by the light quantity monitoring photodiode 33. The comparator 34 compares the output of the photodiode with reference values of light quantity (ref1 and ref2). In accordance with the comparison result, the digital counter 36 is instructed to conduct the count-up operation or the count-down operation.

The digital counter 36 is set to be the count operation state by the light quantity control instructing signal d, and conducts the count operation by using the beam detecting signal z from the beam detecting sensor (SOS) 8 as a clock signal. The count value of the digital counter 36 is converted by the D/A converter 37 into a voltage signal, and the voltage signal is supplied to the current control circuit 35, thereby determining the level of the current flowing through the laser diode 32.

As a result of the above-mentioned operations, the level of the current flowing through the laser diode 32 is controlled so that the light output of the laser diode 32 has a given value corresponding to the switched write density. This control is conducted at the timing when the laser beam passes over the beam detecting sensor (SOS) 8.

The above-mentioned operations are conducted in the period which terminates at time t1 of FIGS. 5(a) to 5(h), i.e., the time when the rotational speed h of the polygonal mirror driving motor reaches the rotational speed corresponding to the high write density. Consequently, the control of the light quantity of the laser diode 32 is accomplished during the period (t0-t1) when the rotational speed of the polygonal mirror is changed, and the stabilized light quantity for the high write density is obtained after time t1.

As seen from the above description, according to the embodiment, the light quantity is switched from that for the low write density to that for the high write density during the period (t0-t1) when the rotational speed of the polygonal mirror is changed, without irradiating the photoreceptor with the laser beams, whereby the period required for switching the write density can be shortened.

What is claimed is:

1. An image output apparatus in which a laser beam emitted from a laser diode is caused to scan a photoreceptor by a rotary polygonal mirror, thereby forming an image on the photoreceptor, said apparatus comprising:

means for setting, when a write density is changed, a rotational speed of the rotary polygonal mirror to a value corresponding to the changed write density;

laser beam forced turn-off signal generating means for generating, while the rotational speed of the rotary polygonal mirror is changing, a forced turn-off signal having a turn-off period which corresponds to the set rotational speed of the rotary polygonal mirror;

means for switching, when the write density is changed, a reference value of light quantity to another reference value corresponding to the changed write density, and means for controlling, when the rotational speed of the rotary polygonal mirror is changed, the light quantity of the laser beam during a laser beam turn-on period.

2. An image output apparatus in which a laser beam emitted from a laser diode is caused to scan a photoreceptor by a rotary polygonal mirror, thereby forming an image on the photoreceptor, and a beam detecting sensor is provided for detecting the emitted laser beam, said apparatus comprising:

means for setting, when a write density is changed, a rotational speed of the rotary polygonal mirror to a value corresponding to the changed write density;

laser beam forced turn-off signal generating means for generating, while the rotational speed of the rotary polygonal mirror is changing, a forced turn-off signal having a turn-off period corresponding to the set rotational speed of the rotary polygonal mirror, the laser beam forced turn-off signal generating means including subtracting means for subtracting a number of pulses which corresponds to the rotational speed of the rotary polygonal mirror from an initial value; and counting means for counting a pixel clock signal;

said forced turn-off signal generating means being set in response to a beam detecting signal from the beam detecting sensor, and being reset when a value of said subtracting means equals a count value of said counting means;

means for switching, when the write density is changed, a reference value of light quantity to another reference value corresponding to the changed write density, and means for controlling, when the rotational speed of the rotary polygonal mirror is changed, the light quantity of the laser beam during a laser beam turn-on period.

3. An image output apparatus in which a laser beam emitted from a laser diode is caused to scan a photoreceptor by a rotary polygonal mirror, thereby forming an image on the photoreceptor, and a beam detecting sensor is provided for detecting the emitted laser beam, said apparatus comprising:

means for setting, when a write density is changed, a rotational speed of the rotary polygonal mirror to a value corresponding to the changed write density;

laser beam forced turn-off signal generating means for generating, while the rotational speed of the rotary polygonal mirror is changing, a forced turn-off signal having a turn-off period corresponding to the set rotational speed of the rotary polygonal mirror;

means for switching, when the write density is changed, a reference value of light quantity to another reference value corresponding to the changed write density, and means for controlling, during the period when the rotational speed of the rotary polygonal mirror is changed, the light quantity of the laser beam during a laser beam turn-on period, said laser beam light quantity controlling means including means for monitoring the light quantity of the laser beam;

means for comparing the monitored light quantity with the another reference value corresponding to the changed write density; and means for correcting the laser beam light quantity when the beam detecting sensor detects the laser beam.

* * * * *